United States Patent [19]

Chapman et al.

[11] 4,227,920

[45] Oct. 14, 1980

[54] METHODS OF CLAY BENEFICATION

[75] Inventors: John H. Chapman, Sandersville, Ga.; David Anderson, Elizabeth, N.J.

[73] Assignee: Yara Engineering Corporation, Springfield, N.J.

[21] Appl. No.: 925,867

[22] Filed: Jul. 18, 1978

[51] Int. Cl.$^2$ .............................................. C04B 33/13
[52] U.S. Cl. ........................................ 75/1 R; 106/72
[58] Field of Search ............................ 75/1 R; 106/72

[56] References Cited

U.S. PATENT DOCUMENTS

| | | | |
|---|---|---|---|
| 3,850,653 | 11/1974 | Zentz | 106/72 |
| 3,860,514 | 1/1975 | Lee | 106/72 |
| 3,961,971 | 6/1976 | Abercrombie | 75/1 R |
| 4,076,548 | 2/1978 | Bundy | 106/72 |

*Primary Examiner*—P. D. Rosenberg
*Attorney, Agent, or Firm*—Buell, Blenko & Ziesenheim

[57] ABSTRACT

A method of beneficiating highly discolored clays to produce a clay of acceptable quality to the paper industry is provided by passing a deflocculated clay suspension through a high intensity magnetic separator, thereafter selectively flocculating the clay from the suspension and recovering the flocculated clay be removing the supernatant liquid.

13 Claims, No Drawings

METHODS OF CLAY BENEFICATION

This invention relates to a method of clay benefication and particularly to a method for improving the brightness and whiteness of clay by a combined magnetic separation and selective flocculation process.

One of the largest consumers of clay, particularly kaolinite, is the paper industry. Large amounts of clay are used in both filling and coating of papers. It is well known in both the clay processing industry and in the paper industry that many factors are involved in the determination of the usefulness of a particular clay product to the paper industry. Two of the more important factors involved in this determination are the brightness and whiteness of the clay when used as a coating pigment or as a filler in the paper industry.

Most of the clays, particularly kaolinite, mined in the United States are discolored. In the case of kaolinte, a vast majority of the mineral comes from secondary deposits found in the Southeast, particularly central Georgia, where it was deposited in prehistoric times along with a variety of discoloring agents such as iron and titanium salts.

Most of these clays are discolored to a degree where no process available to the art could sufficiently improve their brightness and whiteness values to a level that would make them acceptable as a usable pigment or filler, particularly in the paper industry.

For many years, the only available method to maintain brightness and whiteness was that of selection. Only those clays which are naturally white and bright were mined and the vast bulk of clay were simply bypassed or discarded. The only beneficiation of such selected clays to produce a product suitable for use in the paper industry has been to defloculate the parent ore in an aqueous suspension and to separate the fine and coarse particles by a sedimentation process, either gravity or centrifugal. After separation the fine and coarse fractions were treated by various processes to enhance their usefulness to the paper industry.

Recognizing that only a very small percentage of the available clay could be processed in this manner, the industry has diligently sought means for recovering, beneficiating, and using a greater percentage of the natural clay. As a result, there have been, in recent years, many techniques developed for beneficiating and improving clay products. These techniques involve treatment of both the parent ore or a fraction of the parent ore and have been primarily developed for the beneficiation of clay products useful to the paper industry. Among the many methods of beneficiating clay which have been proposed are those which involve delaminating clay aggregates (Lyons Pat. No. 2,904,267), fracturing clay aggregates (Billue Pat. No. 3,058,671 and 3,343,973) and selective flocculation (Rowland Pat. No. 2,758,010).

Even with the many proposals for beneficiating clay which have been advanced over the years, there remains a very substantial portion of the clays or available for mining which are not sufficiently beneficiated by such processes to achieve products of acceptable quality to the paper industry.

We have invented a method for beneficiating the parent ore and/or portions therefrom to produce an improved clay product from clays which otherwise resist beneficiation by any of the known prior art processes.

We have discovered that such clays can be beneficiated by a combination of magnetic separation and selective flocculation to produce a clay product of acceptable quality to the paper industry.

We have found that by combining the two beneficiating techniques of magnetic separation and selective flocculation, a synergistic phenomena occurs and a clay product of superior brightness and whiteness can be obtained that cannot be achieved by beneficiation with either process singularly.

We have found that the high intensity magnetic separation of clays does not remove a significant portion of the finer impurities (which can be removed by selective flocculation) without previous beneficiation with a collector or carrier of these finer impurities to improve the magnetic susceptability of the finer impurities.

We have also found that the selective flocculation of clays does not remove a significant portion of the coarser impurities (which can be removed by magnetic separation) without intensive mechanical and chemical dispersion which results in a signficant degradation of other properties desirable in the clays when used as a coating pigment or filler, particularly in the paper industry.

We have found that by passing the deflocced clay suspension, either as the degritted parent ore or portions therefrom, through a high intensity magnetic separation and subsequently conditioning the resulting clay slurry to improve the dispersion of the remaining portion of the impurities, and then further beneficiation with a high molecular weight anionic polyacrylamide to selectively flocc the clay portion of the suspension, we can successfully remove a greater portion of the colored impurities.

The successful removal of a greater portion of the colored impurities results in clay products with a superior brightness and whiteness value than could be achieved by either the magnetic separation beneficiation or by the selective flocculation beneficiation.

Briefly stated, in accordance with said preferred embodiment of the invention, a slip of impure clay is deflocculated and passed through a high intensity magnetic separator as a degritted (<325 mesh) parent ore and/or as a portion therefrom and further conditioning of the resulting clay slurry with additional defloculating agents and subsequent mechanical dispersion to more completely defloculate the clay and colored impurities in the clay slurry. It is this well defloculated clay-impurity suspension that is then selectively flocced in order to flocc the clay, leaving the impurities in suspension for subsequent separation from the clay portion of the clay-impurity suspension.

THE INVENTION GENERALLY

Preferably the impure clay is formed into a well deflocculated slip (or suspension) of from 20% solids to 70% solids. The said slurry is beneficiated to remove the particles <325 mesh. Thereafter, the entire unfractionated or either of the fine, or coarse fractions of the parent ore may then be processed according to the invention.

In a presently preferred procedure, a defloculated, fractionated fine portion of the impure clay slip is used and a portion of the impurities are removed by magnetic separation. The resulting clay slurry is then conditioned with additional defloculating agents, ground with a fine, hard grinding media, and selectively flocced with a high molecular weight anionic polyacrylamide to remove an additional portion of the impurities.

Polyphosphates, sodium hydroxide, sodium carbonate, and mixtures of deflocculants have successfully been used when carrying out the process of the invention.

MAGNETIC SEPARATION PORTION

In the magnetic separation portion of the invention, sufficient deflocculating agent is employed to insure that the clay and impurities are well dispersed.

The pH of the slurry should be in the range of 5.5. to 9.0. The preferred pH range is 6.5 to 7.5.

The solids content of the clay-impurity suspension should be in the range of 10% to 50%. The preferred solids range is 20% to 35%.

SELECTIVE FLOCCULATION PORTION

In the selective flocculation portion of the invention, sufficient deflocculating agent is employed to insure through dispersion of the remaining portion of the impurities.

The deflocculated clay-impurity suspension is ground with fine, hard media as a the mechanical means used for a more thorough dispersion. P The resulting grinder product is then diluted and the clay-impurity suspension is selectively flocced so as to leave the impurities in suspension.

The pH of the clay-impurity suspension prior to selective flocculation should be in the range of 6.5 to 10.5 with the desired range being 7.5 to 9.5.

The solids content of the clay-impurity suspension prior to selective flocculation should be in the range of 5% to 20% with the desired range being 8% to 12%.

While we have outlined generally the process of this invention in the foregoing description, we believe that it will be more clearly understood by reference to the following examples illustrating the practice of the invention.

EXAMPLE NO. 1

The starting clay was an impure kaolin specimen taken from Washington County, Georgia. The parent ore was deflocculated with a mixture of sodium Hexametaphosphate and sodium carbonate. The amount of deflocculating agent was approximately 0.1% (2 lbs/ton) sodium Hexametaphosphate and 0.05% (1 lb/ton) sodium carbonate.

The parent ore was blunged in the presence of the deflocculating agents at approximately 40% solids in an aqueous media in a mine processing blunger and degritted, removing the particles greater than 325 mesh.

The deflocculated, degritted clay slurry was fractionated by centrifugation so as to yield a product that was approximately 92% <2$\mu$ e.s.d. (equivalent spherical diameter).

A portion of the deflocculated, degritted, fractionated clay-impurity suspension was treated with 0.5% (10#/ton) of a 50/50 blend of tetrasodium pyrophosphate and sodium hexametaphosphate.

The resulting treated suspension was ground with a fine (40-50 mesh size) hard media for a period of 4 minutes on a Model 1-S attritor. (Union Process Co.)

The sample was ground at 600 r.p.m. using a 1:1 ratio of hard media to clay suspension on a volume to volume basis. The aqueous clay-impurity suspension was separated from the hard media by screening and washing and diluted to 10% solids.

The pH of the diluted suspension was adjusted to 8.5 with $NH_4OH$ (10% Solution).

An 800 gram (Dry Basis) sample of the conditioned suspension was selectively flocced with 0.75 lbs/ton of a high molecular weight anionic polyacrylamide (NaLCO 672). Selective flocculation of the clay portion of the suspension was accomplished by slowly adding the NaLCO 672, as a 0.025% solution, to the dilute suspension during mild agitation. The mild agitation was allowed to continue for 1 minute and the agitation stopped. The clay floccs were allowed to free settle in the suspension leaving the discolored impurities in the supernatant. (The settling time was 1 minute).

The supernatant was decanted and the clay floccs were reslurried with clean tap water and the settling and supernatant decantation was repeated.

The clay floccs were blunged for 30 seconds in a laboratory size waring blender at moderate speed. The blunged clay floccs were heated to 60° C. in a water bath and treated with ½ gallon $H_2O_2$ (35%) per ton.

The sample was acid flocced with $H_2SO_4$ (10% solution) to a 3.0 pH and leached with sodium dithionite ($Na_2S_2O_4$).

The sample was filtered and dried and a brightness determination was made according to TAPPI Standard T-646-m-54. The whiteness value was determined to be the numerical difference between the reflectance reading taken at 681 nm and the reflectance reading taken at 426 nm. (The smaller the difference, the whiter the specimen).

For the purpose of this disclosure, all brightness and whiteness values were determined according to the above procedure.

A second portion of the deflocculated, degritted, fractionated clay-impurity suspension (at 25% solids) was passed through a high intensity magnetic separator with the retention time in the magnetic separator being two minutes.

A portion of the magnetically treated suspension was acid flocced with $H_2SO_4$ (10% solution) to a 3.0 pH and leached with sodium dithionite ($Na_2SO_4$). The sample was filtered and dried. The brightness and whiteness values were determined.

A second portion of the magnetically treated suspension was conditioned and selectively flocced according to a procedure identical to the procedure outlined previously for selective flocculation. This sample was acid flocced with $H_2SO_4$ (10% solution) to a 3.0 pH and leached with sodium dithionite ($Na_2S_2O_4$).

The sample was filtered and dried. The brightness and whiteness values were determined.

The brightness and whiteness values of each of the samples are set out in Table I hereinbelow. Higher values of brightness indicate an improvement in that particular characteristic whereas lower values of whiteness indicate an improvement in whiteness.

TABLE NO. 1

| BRIGHTNESS AND WHITENESS VALUES | | |
|---|---|---|
| Sample | Brightness | Whiteness |
| Control | 87.3 | 11.4 |
| Magnetic Separation Alone | 89.3 | 9.9 |
| Selective Flocculation Alone | 89.3 | 9.8 |
| Magnetic Separation + Selective Flocculation | 91.3 | 7.4 |

EXAMPLE NO. 2

The starting clay was a parent ore sample of impure kaolin from Washington County, Georgia.

The sample was deflocculated with a combination of Hexametaphosphate and sodium carbonate (as previously described in Example No. 1) to a pH of 6.2 and blunged on a laboratory size waring blender at 40% solids, in an aqueous suspension.

The sample was degritted to remove the greater than 325 mesh size particles. The resulting deflocculated, degritted clay-impurity suspension was treated with ⅛ gal. NaOCl (15%) per ton of clay and mixed for 24 hours. The mixing intensity was a light stirring action sufficient to keep sedimentation from occurring.

A portion of the deflocculated, degritted, NaOCl treated clay-impurity suspension was fractionated by centrifugation so as to yield a product that was approximately 92% <2μ e.s.d.

Separate portions of this fractionated clay-impurity suspension was beneficiated in a similar fashion as that outlined and described in Example No. 1.

The beneficiation consisted of selective flocculation alone, magnetic separation alone, and the combined beneficiation by magnetic separation and selective flocculation.

A second portion of the deflocculated, degritted, NaOCl treated clay-impurity suspension was fractionated by centrifugation so as to yield a product that was approximately 95% <2μ e.s.d.

Separate portions of this fractionated clay-impurity suspension were beneficiated in a similar fashion as that outlined and described in Example No. 1.

The beneficiation consisted of selective flocculation alone, magnetic separation alone, and the combined beneficiation by magnetic separation, grinding and selective flocculation.

All samples were acid flocced with $H_2SO_4$ (10% solution) to 3.0 pH and leached with sodium dithionite ($Na_2S_2O_4$).

Samples were filtered and dried. The brightness and whiteness values were determined according to the previously described methods and are set out in Table No. 2, below.

TABLE NO. 2

| | 92% <2μ e.s.d. | | 95% <2μ e.s.d. | |
|---|---|---|---|---|
| Sample | Brightness | Whiteness | Brightness | Whiteness |
| Magnetic Separation Alone | 90.0 | 8.9 | 90.4 | 8.6 |
| Selective Flocculation Alone | 90.9 | 8.1 | 91.2 | 7.5 |
| Magnetic Separation + Selective Flocculation | 91.9 | 7.1 | 92.3 | 6.2 |

EXAMPLES NO. 3, NO. 4, AND NO. 5

The starting clays for Examples No. 3, 4 and 5 were parent ore samples of impure kaolin from Washington County, Georgia. The samples were deflocculated, blunged, and degritted as described in the procedure for Example No. 2.

The degritted clay-impurity suspensions were fractionated by centrifugation so as to yield a product that was approximately 92% <2μ e.s.d.

Separate portions of each of the three fractionated clay-impurity suspensions were beneficiated in a similar fashion as that outlined and described in Example No. 2.

The beneficiation consisted of selective flocculation alone, magnetic separation alone, and the combined beneficiation by magnetic separation, grinding and selective flocculation.

All samples were acid flocced, filtered, dried, and brightness and whiteness values determined according to the previously described method. The brightness and whiteness values are set out in Table No. 3.

TABLE NO. 3

| | 3 | | 4 | | 5 | |
|---|---|---|---|---|---|---|
| Sample | Brightness | Whiteness | Brightness | Whiteness | Brightness | Whiteness |
| Control | 86.6 | 12.8 | 85.5 | 13.3 | 38.1 | 11.1 |
| Magnetic Separation Alone | 89.6 | 10.5 | 89.6 | 10.4 | 90.2 | 9.3 |
| Selective Flocculation Alone | 87.6 | 11.2 | 88.1 | 11.2 | 89.0 | 9.7 |
| Magnetic Separation + Selective Flocculation | 90.4 | 9.8 | 91.0 | 8.0 | 90.5 | 8.5 |

EXAMPLE NO. 6

The starting clay was a parent ore sample of impure gray kaolin from Washington County, Georgia. The parent ore was deflocculated and degritted as described in the procedure for Example No. 2.

The deflocculated, degritted clay-impurity suspension was treated with 3 gallon NaOCl (15%) per ton of clay and mixed overnight with enough stirring action to keep sedimentation from occurring.

The resulting deflocculated, degritted, NaOCl treated clay-impurity suspension was fractionated by centrifugation so as to yield a product that was approximately 92% <2μ e.s.d.

Portions of the fractionated clay-impurity suspension were beneficiated in a similar fashion as that described in Example No. 1.

The beneficiation consisted of selective flocculation alone, magnetic separation alone, and the combined beneficiation by magnetic separation and selective flocculation.

The samples were processed for brightness and whiteness value determination as previously described and the values tabulated in Table 4.

TABLE NO. 4

| BRIGHTNESS AND WHITENESS VALUES | | |
|---|---|---|
| Sample | Brightness | Whiteness |
| Control | 85.6 | 13.5 |
| Magnetic Separation Alone | 89.3 | 9.0 |
| Selective Flocculation Alone | 90.0 | 8.5 |
| Magnetic Separation + Selective Flocculation | 91.4 | 6.5 |

EXAMPLE NO. 7

The starting clay was a parent ore sample of impure gray kaolin from Washington County, Ga. The parent ore was deflocculated, degritted, and treated with NaOCl according to the procedure described in Example No. 6.

The deflocculated, degritted, NaOCl treated clay-impurity suspension was fractionated by centrifugation so as to yield a product that was approximately 82% <2μ e.s.d.

Separate portions of the fractionated clay-impurity suspension were beneficiated in a similar fashion as that described in Example No. 1.

The beneficiation consisted of selective flocculation alone, magnetic separation alone, and the combined beneficiation by magnetic separation, grinding and selective flocculation. A portion of each of the separately beneficiated samples were further fractionated by centrifugation so as to yield a product that was approximately 92% <2μ e.s.d.

The samples were processed for brightness and whiteness value determinations as previously described and the values appear in Table 5 below.

TABLE NO. 5

| | BRIGHTNESS AND WHITENESS VALUES | | | |
|---|---|---|---|---|
| | 82% <2μ e.s.d. | | 92% <2μ e.s.d. | |
| Sample | Brightness | Whiteness | Brightness | Whiteness |
| Control | 85.2 | 13.2 | 86.0 | 13.0 |
| Magnetic Separation Alone | 88.6 | 11.3 | 88.8 | 11.2 |
| Selective Flocculation Alone | 89.4 | 10.2 | 89.8 | 10.1 |
| Magnetic Separation + Selective Flocculation | 90.4 | 8.2 | 91.9 | 7.2 |

EXAMPLE NO. 8

The starting clay was a parent ore sample of impure non-gray kaolin from Washington County, Georgia.

The parent ore was deflocculated and degritted as described in the procedure for Example No. 2.

The deflocculated, degritted clay impurity suspension was treated with 1/16 gallon NaOCl (15%) per ton of clay and mixed overnight with enough stirring action to keep sedimentation from occurring.

The NaOCl treated clay-impurity suspension was fractionated and beneficiated in a similar fashion as that described in the procedure for Example No. 7.

A portion of each of the separately beneficiated samples were fractionated in a similar fashion as that described in the procedure for Example No. 7.

The samples were processed for brightness and whiteness value determinations as previously described.

TABLE NO. 6

| | BRIGHTNESS AND WHITENESS VALUES | | | |
|---|---|---|---|---|
| | 82% <2μ e.s.d. | | 92% <2μ e.s.d. | |
| Sample | Brightness | Whiteness | Brightness | Whiteness |
| Control | 86.4 | 12.8 | 88.1 | 12.5 |
| Magnetic Separation Alone | 89.5 | 10.2 | 90.1 | 9.6 |
| Selective Flocculation Alone | 88.9 | 11.2 | 89.7 | 10.0 |
| Magnetic Separation + Selective Flocculation | 90.6 | 8.3 | 91.1 | 7.8 |

EXAMPLE NO. 9

The starting clay was an impure sample of kaolin from Washington County, Ga. The parent ore was deflocculated and degritted according to the procedures described in Example No. 1.

The deflocculated and degritted clay-impurity suspension was beneficiated by passing said clay slurry through a high intensity magnetic separator. The beneficiated clay slurry was ground with hard media so as to yield a product that was approximately 78% <2μ e.s.d.

Separate portions of the ground clay slurry were beneficiated using the following procedures:

PROCEDURE NO. 1

A portion of the ground clay slurry was beneficiated by selective flocculation as described in the procedure in Example No. 1.

PROCEDURE NO. 2

A portion of the ground clay slurry was beneficiated by fractionation by centrifugation so as to yield a product that was approximately 84% <2μ e.s.d.

PROCEDURE NO. 3

A portion of the ground clay slurry was beneficiated by fractionation by centrifugation so as to yield a product that was approximately 92% <2μ e.s.d.

The samples were processed for brightness value determinations as previously described. These values are set out in Table 7 below.

TABLE NO. 7

| BRIGHTNESS VALUES | | |
|---|---|---|
| Sample | Brightness | |
| Control | 85.4 | |
| After magnetic separation | 88.4 | |
| After magnetic separation + grinding | 89.8 | |
| After magnetic separation + grinding + selective flocculation | 90.4 | |
| | 84.7% <2μ e.s.d. | 92% <2μ e.s.d. |
| After magnetic separation + grinding + Fractionation | 90.0 | 90.1 |

EXAMPLE NO. 10

The starting clay was an impure sample of kaolin from Washington County, Ga. The parent ore was deflocculated and degritted according to the procedure described in Example No. 1. The deflocculated, degritted clay-impurity suspension was fractionated by centrifugation so as to yield a product that was approximately 82% <2μ e.s.d.

The coarse fraction from the fractionation beneficiation was further beneficiated by passing said coarse fraction through a high intensity magnetic separator.

The magnetically beneficiated clay slurry was ground with hard media so as to yield a product that was approximately 75% <2μ e.s.d.

A portion of the ground clay slurry was further beneficiated by fractionation by centrifugation so as to yield a product that was approximately 84% <2μ e.s.d.

Another portion of the ground clay slurry was further beneficiated by selective flocculation as described in the procedure in Example No. 1.

The samples were processed for brightness value determinations as previously described and the values appear in Table 8.

TABLE NO. 8

| BRIGHTNESS VALUES | |
|---|---|
| Sample | Brightness |
| After magnetic separation + grinding | 90.0 |
| After magnetic separation + grinding + fractionation | 90.3 |
| After magnetic separation + grinding + | |

TABLE NO. 8-continued

| BRIGHTNESS VALUES | |
|---|---|
| Sample | Brightness |
| selective flocculation | 91.0 |

EXAMPLES NO. 11, NO. 12 AND NO. 13

The starting clays for these examples were impure gray kaolin samples from Washington County, Ga.

The parent ores were deflocculated and degritted according to the procedure described in Example No. 1. The deflocculated, degritted clay-impurity suspensions were treated with NaOCl and mixed overnight with sufficient stirring action to keep sedimentation from occurring.

The deflocculated, degritted, NaOCl treated clay-impurity suspensions were fractionated by centrifugation so as to yield a product that was approximately 92% <2μ e.s.d.

Separate portions of each of the deflocculated, degritted, NaOCl treated, and fractionated clay-impurity suspensions were beneficiated according to the following procedures:

PROCEDURE NO. 1

A portion of each of the fractionated clay slurries was beneficiated by passing said clay slurry through a high intensity magnetic separator at various retention rates.

PROCEDURE NO. 2

A portion of each of the fractionated clay slurries was beneficiated by selective flocculation as described in the procedure in Example No. 1.

PROCEDURE NO. 3

A portion of each of the magnetically beneficiated clay slurries in procedure No. 1 was beneficiated by selective flocculation as described in the procedure in Example No. 1.

The samples were processed for brightness value determinations as previously described. The brightness values for each example are set out in Table 9.

TABLE NO. 9

| | BRIGHTNESS VALUES | | |
|---|---|---|---|
| Sample | No. 11 Brightness | No. 12 Brightness | No. 13 Brightness |
| Control | 86.0 | 85.6 | 86.0 |
| After Selective Flocculation | 89.8 | 90.0 | 89.0 |
| After magnetic separation at 1 min. retention | | | 86.8 |
| After magnetic separation at 2 min. retention | | 87.5 | 88.0 |
| After magnetic separation at 3 min. retention | 88.6 | | |
| After magnetic separation at 4 min. retention | 89.4 | 87.8 | 88.4 |
| After magnetic separation at 1 min. retention + selective flocculation | | | 89.5 |
| After magnetic separation at 2 min. retention + selective flocculation | | 91.3 | 90.0 |
| After magnetic separation at 3 min. retention + selective flocculation | 91.0 | | |
| After magnetic separation at 4 min. retention + selective flocculation | 91.7 | 91.6 | 90.4 |

In the foregoing specification we have set out certain preferred practices and embodiments of our invention, however, it will be understood that this invention may be otherwise embodied within the scope of the following claims.

We claim:

1. A method of beneficiating highly discolored clays to produce a clay of acceptable quality to the paper industry comprising the steps of:
   a. forming an aqueous suspension of a clay to be beneficiated,
   b. deflocculating said aqueous clay suspension,
   c. first, passing said deflocculated clay suspension through a high intensity magnetic separator,
   d. further deflocculating said clay after passing through said magnetic separator,
   e. second, selectively flocculating the clay from the suspension after it has passed through said high intensity magnetic separator,
   f. removing the supernatant liquid from the flocculated clay, and
   g. recovering a clay of improved whiteness and brightness from said selectively flocculated clay.

2. The method as claimed in claim 1 wherein the deflocculated clay is beneficiated to remove particles >325 mesh prior to passing through the magnetic separator.

3. The method as claimed in claims 1 or 2 wherein the pH of the suspension is about 5.5. to 9.0 during the magnetic separation step.

4. The method as claimed in claims 1 or 2 wherein the pH of the suspension is about 6.5 to 7.5 during the magnetic separation step.

5. The method as claimed in claims 1 or 2 wherein the solids content of the suspension is about 10% to 50% during the magnetic separation step.

6. The method as claimed in claims 1 or 2 wherein the solids content of the suspension is about 20% to 35% during the magnetic separation step.

7. The method as claimed in claims 1 or 2 wherein the pH of the suspension is about 6.5 to 10.5 during the selective flocculation step.

8. The method as claimed in claims 1 or 2 wherein the pH of the suspension is about 7.5 to 9.5 during the selective flocculation step.

9. The method as claimed in claims 1 or 2 wherein the solids content of the suspension is about 5% to 20% during the selective flocculation step.

10. The method as claimed in claims 1 or 2 wherein the solids content of the suspension is about 8% to 12% during the selective flocculation step.

11. The method as claimed in claims 1 or 2 wherein the pH of the suspension is about 5.5 to 9.0 at a solids content of about 10% to 50% during the magnetic separation step, ground with fine hard media between the magnetic separation and selective flocculation steps and selectively flocculated at a pH of about 6.5 to 10.5 at a solids content of about 5% to 20%.

12. The method as claimed in claims 1 or 2 wherein the pH of the suspension is about 6.5 to 7.5 at a solids content of about 20% to 35% during the magnetic separation step, ground with fine hard media between the magnetic separation and selective flocculation steps and selectively flocculated at a pH of about 7.5 to 9.5 at a solids content of about 8% to 12%.

13. The method as claimed in claims 1 or 2 wherein the selective flocculation is carried out by adding a high molecular weight anionic polyacrylamide as the selective flocculating agent.

* * * * *

UNITED STATES PATENT AND TRADEMARK OFFICE
CERTIFICATE OF CORRECTION

PATENT NO. : 4,227,920
DATED : October 14, 1980
INVENTOR(S) : JOHN H. CHAPMAN and DAVID ANDERSON It is certified that error appears in the above-identified patent and that said Letters Patent are hereby corrected as shown below:

In the Abstract, in the next to last line, after "clay", the word "be" should read --by--.

Column 1, line 33, "clay" should be --clays--.

Column 3, line 25, "P" should be omitted.

In TABLE NO. 3, under "5 Brightness", "38.1" should be --88.1--.

Signed and Sealed this

Third Day of March 1981

[SEAL]

Attest:

RENE D. TEGTMEYER

Attesting Officer    Acting Commissioner of Patents and Trademarks